June 16, 1925.  1,542,554
E. R. JAGENBURG
FRUIT SLICE CUTTING MACHINE
Filed Dec. 10, 1924   4 Sheets-Sheet 1

INVENTOR
E. R. Jagenburg
BY
his ATTORNEY

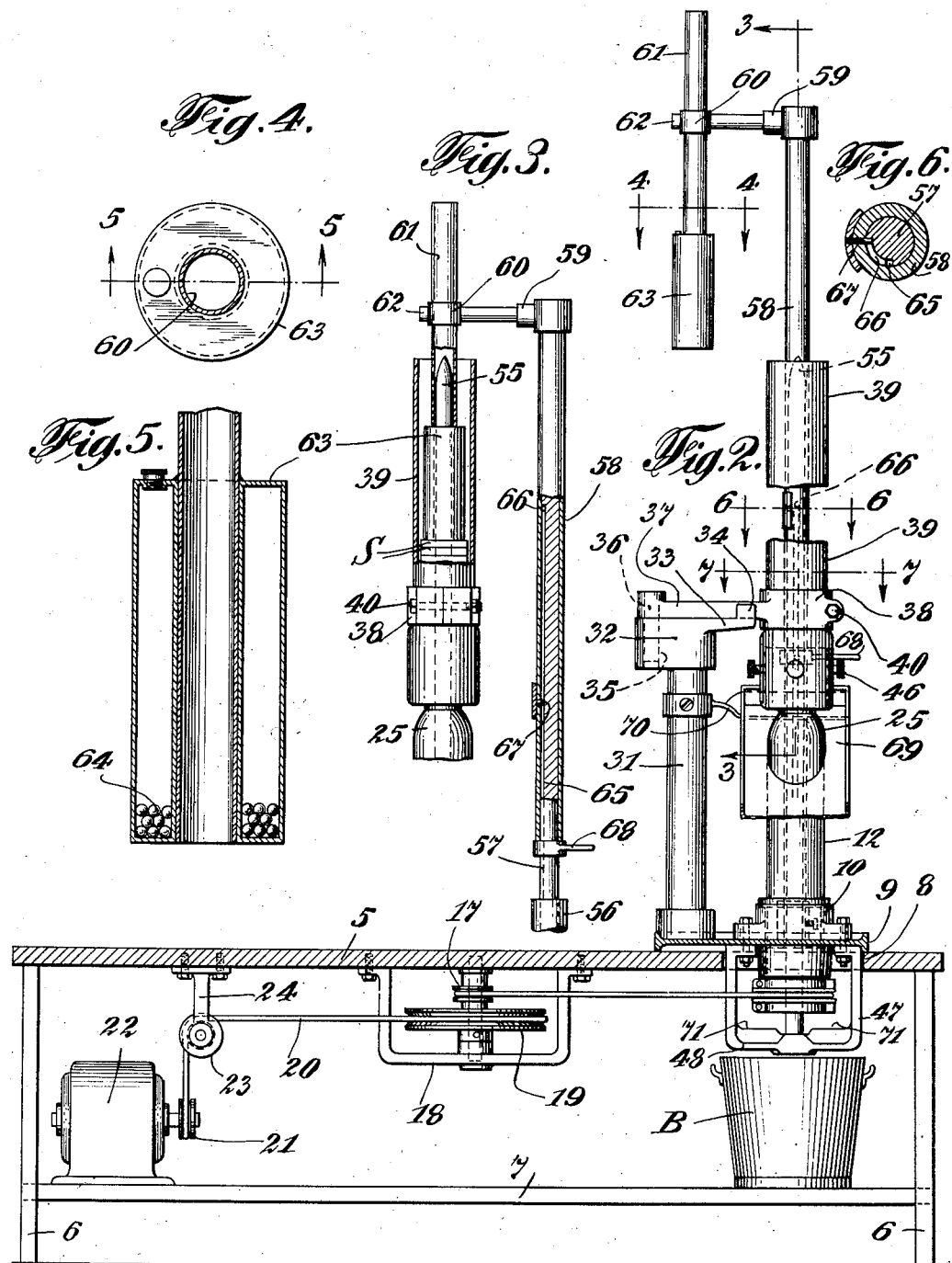

June 16, 1925.  
E. R. JAGENBURG  
FRUIT SLICE CUTTING MACHINE  
Filed Dec. 10, 1924  
1,542,554  
4 Sheets-Sheet 3
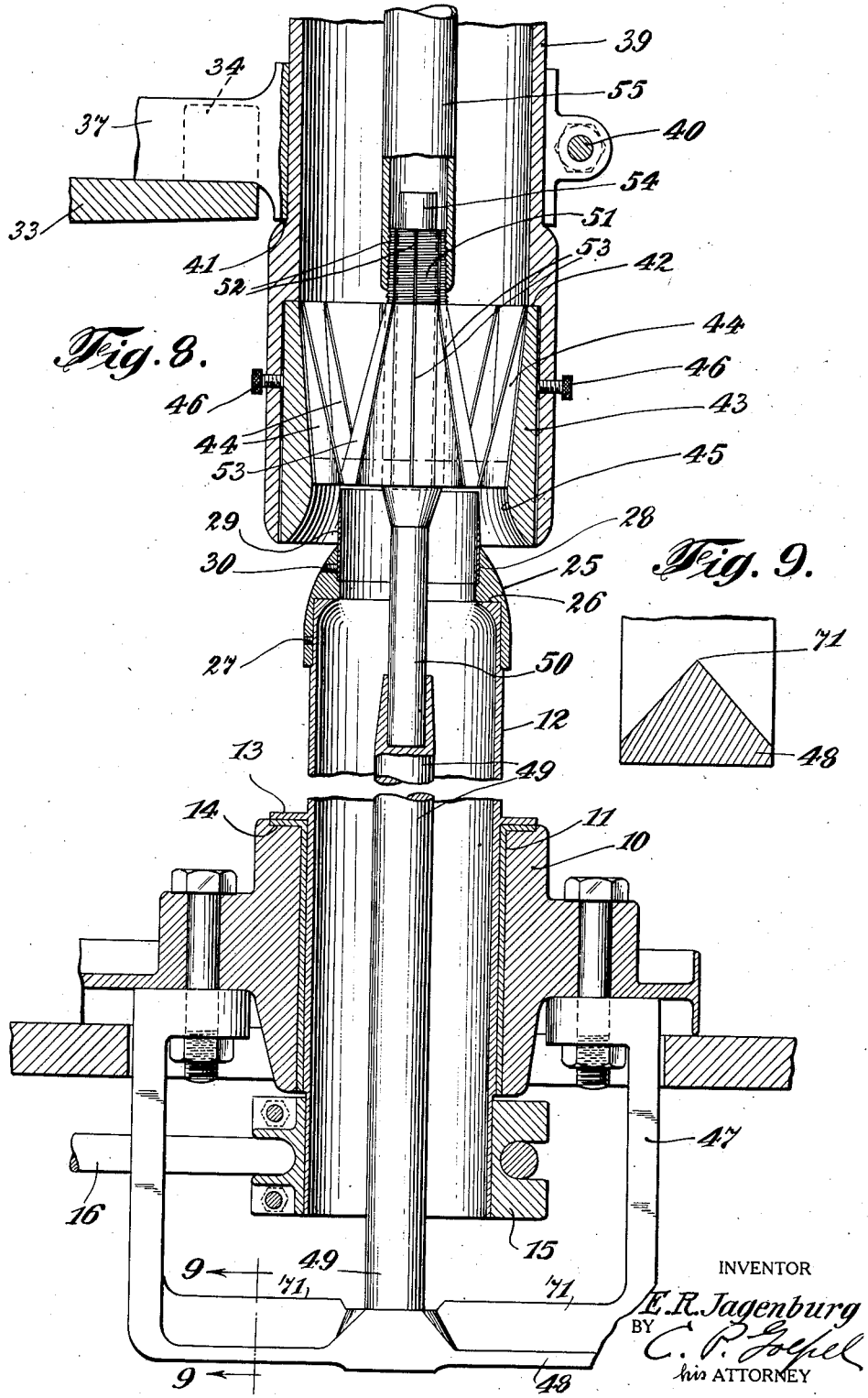
INVENTOR  
E. R. Jagenburg  
BY  
his ATTORNEY June 16, 1925.
E. R. JAGENBURG
FRUIT SLICE CUTTING MACHINE
Filed Dec. 10, 1924
4 Sheets-Sheet 4
1,542,554
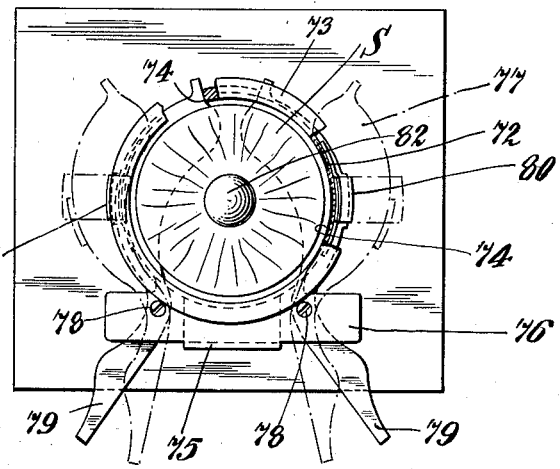
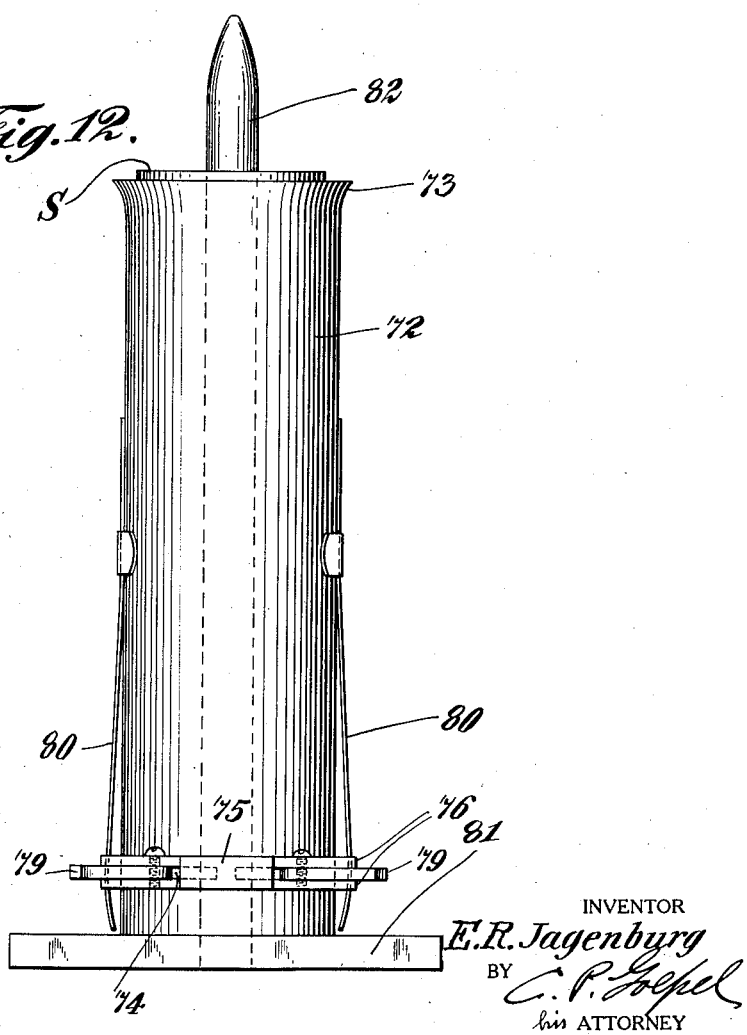
INVENTOR
E.R.Jagenburg
BY
his ATTORNEY Patented June 16, 1925.

1,542,554

UNITED STATES PATENT OFFICE.

EUGENE ROBERT JAGENBURG, OF NEW YORK, N. Y.

FRUIT-SLICE-CUTTING MACHINE.

Application filed December 10, 1924. Serial No. 754,905.

*To all whom it may concern:*

Be it known that I, EUGENE ROBERT JAGENBURG, a citizen of the United States, and a resident of New York city, county and State of New York, have invented certain new and useful Improvements in Fruit-Slice-Cutting Machines, of which the following is a specification.

This invention relates to an improved machine for cutting fruit and generically considered has for its principal object to provide a machine of comparatively simple construction for cutting fruit slices, such as pineapple and the like, into portions or particles of substantially uniform size. Such cut fruits are used by confectioners in large quantities, and form the centers for candies and in other cases are glazed.

My new machine in its essential features embodies a new method of cutting or dividing annular fruit slices into portions of approximately uniform size, such new method being characterized by first cutting the fruit slices along different radial lines at a plurality of space points from its inner and outer edges, such radial cuts over-lapping each other and then cutting through the fruit slices circumferentially thereof, substantially midway between its inner and outer edges, such circular cut intersecting the over-lapping ends of the radial cuts, whereby the fruit slice is thus divided into a plurality of independent particles.

Another of the important features of my present invention resides in an improved mounting and arrangement of the radial cutting knives and also of the arrangement of the circular cutting knife with respect to the said radial knives.

Among other novel features of the present invention, reference may be made to an improved means for feeding superimposed fruit slices under pressure to the cutting knives and a convenient means for expeditiously assembling a large number of the fruit slices and transferring the same to a feed magazine or cylindrical hopper.

With the above and other objects in view, the invention consists in the improved fruit slicing machine and in the form, construction and relative arrangement of its several parts as will be hereinafter more fully described, illustrated in the accompanying drawings and subsequently incorporated in the sub-joined claims.

In the drawings wherein I have illustrated one simple and practical embodiment of the invention and in which similar reference characters designate corresponding parts throughout the several views—

Figure 2 is a sectional view, taken substantially on line 2—2 of Figure 1 and certain of the parts being broken away.

Figure 3 is a detail sectional view taken substantially on the line 3—3 of Figure 2, illustrating the mounting and arrangement of the gravity feed plunger.

Figure 4 is an enlarged horizontal section, taken on the line 4—4 of Figure 2.

Figure 5 is an enlarged longitudinal section of the feed plunger.

Figure 6 is an enlarged horizontal section taken on the line 6—6 of Figure 2.

Figure 8 is an enlarged vertical sectional view taken on the line 8—8 of Figure 7.

Figure 9 is a detailed transverse section taken on the line 9—9 of Figure 8.

Figure 11 is a plan view of an assembling device for the fruit slices, and

Figure 12 is a side elevation thereof.

Figure 1:
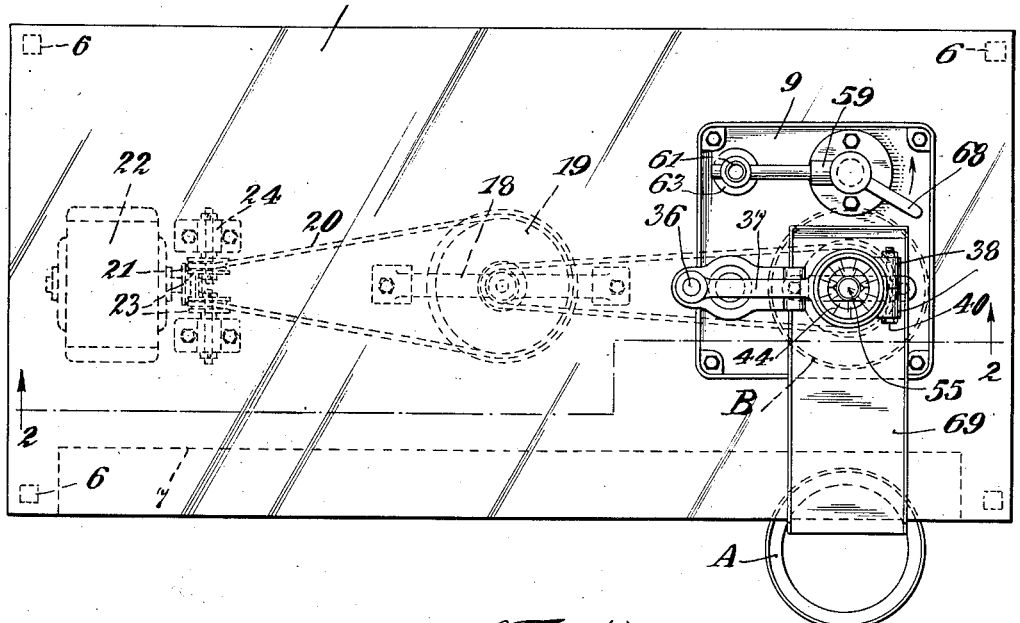
Figure 1 is a top plan view, illustrating one preferred embodiment of the invention.

In the accompanying drawings, I have shown the fruit cutting machine mounted upon a suitable table or support 5, having the legs or standards 6 at its opposite ends and between which in spaced relation to the table top a suitable shelf 7 is supported.

The top of the table 5 at one of its ends is provided with an opening 8, over which the base 9 of the machine is arranged and bolted or otherwise fixed to the table top. This base 9 is provided with a hub or sleeve 10, extending above and below the plane of said base in substantially concentric relation with the opening 8 in the table top. A flanged bushing 11 extends through this vertically positioned sleeve and a cylinder 12 is rotatably engaged within said bushing, the wall of the said cylinder being provided with an annual flange 13 resting upon the flange 14 on the upper end of the sleeve 11. It will be understood that if desired, an anti-friction bearing of any improved type may be interposed between the flanges 13 and 14. The sleeve 12 extends below the bushing 11 and has suitably fixed upon its lower end the drive-pulley 15 to receive the driving belt 16. As herein shown, this belt is driven from the pulley 17 on a vertically positioned power transmitting shaft mounted between the table top 5 and a bearing bracket 18 affixed to said table top. A second pulley 19 of relatively large diameter is also fixed on this shaft and is driven by the belt 20 from the pulley 21 on the shaft of a suitable motor 22, said belt 20 being trained over guide sheaves 23 mounted on the lower ends of hanger bearing 24, fixed to the table top 5.

A head 25 is detachably secured upon the upper end of the cylinder 12. This head, as herein shown, is in the form of a tapering shell, the larger end of which is adapted to fit over the upper end of the cylinder 12, said head having an internal annular shoulder 26, engaging upon the upper edge of the cylinder wall. The head is removably fixed in connection with the cylinder by a suitable set screw 27. The smaller end of the head 25 projecting above the cylinder is counter-bored as at 28 to receive the lower end of the tubular cutting knife 29, which is detachably fixed to the said head by the set screw 30.

At one side of the hub or sleeve 10 on the base 9, a standard 31 is mounted upon said base. A casting 32 is fixed to the upper end of said standard and is provided with an arm 33, having spaced up-standing lugs 34 on its end. The casting 32 is also provided with a vertical opening or socket indicated at 35, to removably receive a pin 36 fixed in one end of a bracket member 37. The other end of this bracket member is provided with a split collar 38, which is adapted to receive a cylinder or magazine 39, the two portions of the collar being connected by a clamping bolt 40, whereby said magazine may be rigidly clamped or fixed in position. The lower end of this magazine is externally enlarged to provide an annular stop shoulder 41 contacting with the lower end of the collar 38. This lower end of the magazine is also counter-bored to provide an internal shoulder 42, against which one end of a removable sleeve 43 is adapted to seat. The inner surface of this sleeve is longitudinally tapered, the sleeve wall being provided with a plurality of spaced slots, in which the outer edges of a series of radially disposed cutting knives 44 are suitably fixed. The cutting edges of these knives gradually diverge from the inner tapering face of the sleeve 43 at the larger end of said tapering face and terminate in spaced relation to the other end of the sleeve. From this smaller end of the tapering surface, the inner face of the sleeve wall is curved or convexed as shown in 45. Thus, as will be seen in Figure 8 of the drawings, when the sleeve 43 is fixed within the counter-bored lower end of the magazine 39 by the set screws 46, the cutting edges of the knives 44 at their upper ends practically merge into the inner surface of the magazine cylinder and from this point, said cutting edges of the knives extend inwardly towards the axial center of the sleeve 43.

Figure 7:
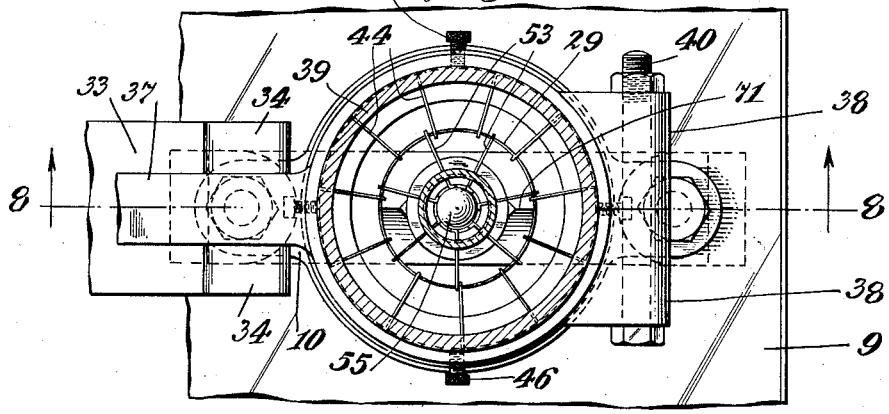
Figure 7 is an enlarged horizontal section taken on the line 7—7 of Figure 2.

There is associated with the radial cutting knives 44, an inner series of cutting knives; these latter knives are preferably mounted and arranged in the following manner:— A U-shaped hanger bracket 47 is fixed to the base 9, the parallel vertical arms of said bracket extending downwardly through the opening 10. The intermediate portion 48 of said bracket is horizontally disposed below the cylinder 12 and centrally thereof is formed with a bearing seat for the lower end of a vertically positioned rod 49, which extends within the cylinder 12 axially thereof. The upper end of this rod has suitably fixed thereto the lower end of a second rod 50. This rod 50 is formed with an enlarged threaded section 51, which is longitudinally split at a plurality of space points as shown at 52 to receive the inner edges of the cutting blades 53. This threaded section 51 of the rod is of hollow or tubular form and receives the pin 54. The lower end of a hollow post or spindle 55 is adapted to be threaded upon the upper end of the split portion of the rod 50, the co-acting threaded parts of said spindle and the rod being tapered, whereby the split sections 51 of the rod are contracted and the inner edges of the knives 53 securely clamped therebetween. As shown in Figure 8 of the drawings, these cuttting knives 53 are positioned in different radial planes with respect to the knives 54 and the cutting edges of said knives 53 are inclined in an outward direction, the upper ends of said cutting edges practically merging into the threaded section 51 of the rod 50. From reference to Figure 7 of the drawings, it will be noted that at their lower ends the knives 44 and 53 are of such width that they slightly overlap each other. The upper cutting edge of the tubular knife 29 is of such diameter that it will intersect the radial cuts made by the knives 54 and 53 at their over-lapping ends, said cutting edge of the knife 29 being disposed contiguous to the lower ends of the knives 44 and 53.

There is also provided upon the base 9 and in line with the magazine 39, transversely of the table 5, a second standard 56, the upper end portion 57 of which is of reduced diameter. Over this reduced portion of the standard, a tube 58 has free sliding movement. The upper end of this tube is closed by one end of a horizontal arm 59, which is suitably fixed thereto, said arm at its other end being provided with a collar 60 in which a tubular rod 61 is loosely engaged for vertical adjustment, said rod being fixed in its adjusted position by a set screw 62 threaded in the collar 60. There is suitably secured to the lower end of the tubular rod 61 a weighted plunger 63. As herein shown, this plunger is in the form of a cylindrical chamber, annular in cross section, the upper end wall of said chamber having a suitable opening through which shot or other weight elements indicated at 64 may be inserted into said chamber.
The upper end portion 57 of the standard 56 is provided in the side thereof next adjacent to the magazine 39 with a longitudinal key-way 65. At its upper end, this key-way is circumferentially extended for a short distance as indicated at 66. The tube 58 carries a pin 67, projecting into the key-way 65, which prevents a rotative movement of the tube upon the guide standard. The lower end of the tube is provided with a suitable handle 68 whereby said tube together with the plunger 63 may be raised or lifted upon the upper end 57 of the standard 56. Beneath the magazine 39 the upper end of a transversely positioned downwardly inclined discharge trough or chute 69 is positioned. This trough may be conveniently secured at its upper end to a fixed horizontal projecting arm 70 on the standard 31. As will be hereinafter explained this trough discharges a portion of the fruit particles into a suitable collection receptacle, indicated at A, which is arranged upon the floor at one side of the table 5.

Upon reference to Figures 8 and 9, it will be noted that the transverse bar 48 of the U-shaped hanger bracket 47 is of V-shape cross sectional form, presenting a sharp upper edge 71. Thus, other particles of fruit falling through the sleeve 12 will strike upon this upper edge of the bar 48 and be directed in opposite directions by the inclined surfaces of said bar into a second collection receptacle B, which is arranged upon the shelf 7.
As a convenient means for facilitating the charging of the magazine 39 with the fruit slices, I have shown in Figure 12 of the drawings, a cylindrical hopper 72, which is open at its opposite ends, the upper end of said hopper being outwardly flared as at 73, so that the fruit slices may be easily inserted therein. Adjacent to the other end of said hopper, the wall thereof is provided with opposed circumferentially extending slots
74. A frame 75 is provided with an annular portion 76 surrounding the hopper 72, said annular portion having spaced flanges located above and below the slots 74 in the hopper wall. Between these flanges the members 77 are movably positioned, said members being pivoted upon the frame 75 as shown at 78, and each provided with a suitable finger piece 79. The members 77 are normally urged inwardly through the slots 74 in the hopper wall by the leaf springs 80 which are fixed at one of their ends upon the outer side of the hopper 72 at diametrically opposite points, and at their other or free ends bear against the outer edges of the respective members 77. Thus, as shown in Figure 11 of the drawings, the members 77 at one side of their pivots have their inner edges spaced eccentrically from the wall of the hopper so that said members will provide an adequate support for the fruit slices.

The hopper above described is adapted to be positioned upon a base 81 and over a vertical rod or spindle 82 fixed in said base. The cut slices of pineapple or other fruit indicated at S are then successively inserted into the upper end of hopper 72, the rod 82 extending through the central openings in the fruit slices and guiding the same in their downward movement in the hopper. The first slice of course comes to a position of rest upon the members 77, and the succeeding slices of fruit arrange themselves in superimposed relation upon each other until the hopper 72 is completely filled.

It will be understood that this hopper as well as the magazine 39 may be of any desired capacity.

In charging the magazine 39 with the fruit slices, the filled hopper 72 is lifted from the base 81, the fruit slices contained in the hopper being thereby stripped from the rod or spindle 82. This hopper which is of substantially the same diameter as the magazine 39 is then positioned upon the upper end of said magazine, so that the vertical guide spindle 55 will be in substantial alignment with the openings in the fruit slices. The finger pieces 79 of the supporting member 77 are then pressed towards each other so that said members are moved to the position shown in the dotted lines in Figure 11 of the drawings, whereby the inner edges of said members are positioned outwardly of the inner surface of the hopper wall. The superimposed fruit slices are thus released so that they drop by gravity and move downwardly within the magazine 39 upon the guide spindle 55.

Figure 10:
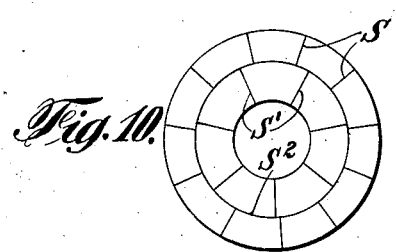
Figure 10 is a plan view illustrating the manner in which the fruit slices are cut.

After the magazine 39 has thus been charged with the fruit slices, the tube 58 is turned upon the upper end of the standard 56 to move the pin 67 from the horizontal extension 66 by the key-way 65 into alignment with the longitudinal portion of said key-way, at which time the tubular rod 61 will be positioned in axial alignment with the vertical spindle 55. Thus, the weighted plunger 63 will drop by gravity and engage upon the uppermost fruit slice in the magazine, said plunger forcing the fruit slices downward upon the oppositely inclined cutting edges of the two series of knives 44 and 53. Obviously, these knives will necessarily cut through the superimposed fruit slices in relatively opposite radial directions for a distance equivalent to the greatest width of the knife blades, which in the present instance is approximately one-half the width of the fruit slices, in other words, as shown in Figure 10 of the drawings the outer series of knives 44 will cut inwardly from the outer edge of the fruit slices along radial lines and at equi-distantly spaced points, while the inner series of knife blades 53 will cut outwardly from the inner edge of the fruit slices along radial lines, and owing to the arrangement of the two series of knives with respect to each other, the one series of radial cuts will be out of alignment with the other series. However, as clearly shown in Figures 7 and 10 of the drawings, the opposed ends of these two series of radial cuts slightly over-lap each other. In Figure 10 I have indicated the outer series of radial cuts of the fruit slices at $s$ and the inner series of radial cuts at $s'$. As the fruit slices are successively forced downwardly below the cutting knives by the weight of the plunger 63, they are cut by the circular edge of the tubular cutting knife 29 approximately on the line indicated at $s^2$ in Figure 10 of the drawings. It will be noted that this circular cut intersects the over-lapping ends of the two radial series of cuts $s$ and $s'$. It is therefore evident that the annular fruit slices are cut or divided into two series of particles which are of approximately uniform size. The outer series of fruit particles fall downwardly exteriorly of the circular cutting knife 29 and into the inclined trough or chute 69, whereby they are directed into the collection receptacle A. The outward or convex curvature 45 of the inner surface of the sleeve 43 below the radial knife blades obviates the possibility of these fruit portions being caught or held between the wall of said sleeve and the circular cutting knife 29 and serves to direct the fruit particles outwardly away from the cutting edge of the knife.

The inner series of fruit particles fall downwardly through the tubular knife 29 and through the cylinder 12 so that they strike upon the bar 48 of the hanger 47 as above explained and are directed into the second collection receptacle B.

After the magazine has become exhausted the operator grasps the handle 68 and moves the tube 58 upwardly upon standard 56, thereby elevating the plunger 63 above the magazine 39. The tube 58 is then given a slight turn so as to engage the pin 67 carried thereby in the lateral extension 66 of the key-way 65, whereby the plunger will be supported at one side of the magazine and in such position that it will not interfere with the recharging thereof.

From the above description, considered in connection with the accompanying drawings, the construction and manner of operation of my improved fruit cutting machine will be clearly understood. It will be apparent that by means of such a machine, the cutting of annular slices of fruit, such as pine-apple, may be greatly facilitated. It is important in the use of such fruits as candy centers or for other confectionery purposes, that the fruit particles or pieces shall be approximately of uniform size. This desired uniformity in the size of the fruit pieces is obtained by means of the present invention. It is, of course, apparent that interchangeable sleeves 43 may be provided for the lower end of the magazine, said sleeves having different numbers of the knives 44 and 53. Also, by providing interchangeable heads 25 for the upper end of the cylinder 12, the circular or tubular cutting knives 29 of relatively different diameters may be employed. Thus, the fruit slices can be cut or divided into any desired number of particles in accordance with the size of the fruit slices and the desired size of the individual particles.

I have also referred to a particular means for driving the rotary cutting knife 29. It will be apparent, however, that this particular means is not essential, and gearing or any other suitable power transmission mechanism between the motor or source of power and said cutting knife may be provided.

In addition to the novel features of the machine herein disclosed, I also consider that the manner or method which I have devised for cutting or sub-dividing an annular fruit slice into a plurality of portions or particles of substantially uniform size is an important part of my invention. Therefore, in so far as such new method is concerned, it is manifest that it is not essential that a machine of the detail construction herein described shall be employed. Morever, it is to be understood that in practice I reserve the right to exemplify my present improvements in various other alternative embodiments and to adopt numerous modifications in the form, construction and relative arrangement of the several machine elements as herein described and as may fairly be considered as embraced within the spirit and scope of the appended claims.

What I claim is:—

1. In a machine for cutting an annular fruit slice into a plurality of portions, knives for producing spaced cuts in the fruit slice, extending radially from the inner and outer edges thereof, and additional means for cutting through the fruit slice on a circular line intersecting said radial cuts.

2. In a machine for cutting an annular fruit slice into a plurality of portions of substantially uniform size, two series of knives, each arranged to produce radial cuts in the fruit slice, extending respectively from the inner and outer edges thereof, and additional means for cutting through the fruit slice on a circular line intersecting said radial cuts.

3. In a machine for cutting an annular fruit slice into a plurality of portions of substantially uniform size, two series of knives, each arranged to produce radial cuts in the fruit slice, extending respectively from the inner and outer edges thereof, the knives in each series being equi-distantly spaced from each other and disposed out of radial alignment with the knives in the other series and additional means for cutting through the fruit slice on a circular line intersecting said radial cuts.

4. In a machine for cutting an annular fruit slice into a plurality of portions of substantially uniform size, two series of stationary knives radially disposed with respect to a common center and having inclined cutting edges to produce radial cuts extending respectively from the inner and outer edges of the fruit slice when the same is moved between said two series of knives, the said stationary knives being arranged out of radial alignment with each other, and additional means arranged contiguous to said knives for cutting through the fruit slice on a line intersecting said radial cuts.

5. In a machine for cutting an annular fruit slice into a plurality of portions of substantially uniform size, two series of stationary knives radially disposed with respect to a common center and having inclined cutting edges to produce radial cuts extending respectively from the inner and outer edges of the fruit slice when the same is moved between said two series of knives, the said stationary knives being arranged out of radial alignment with each other, and a rotary cutter arranged contiguous to said two series of knives and adapted to cut through the fruit slice on a circular line intersecting said radial cuts.

6. In a machine for cutting annular slices of fruit into a plurality of portions of substantially uniform size, a magazine to receive the fruit slices, stationary means arranged at one end of the magazine and upon which the fruit slices are forced under gravity pressure, said means operating to produce a plurality of radial cuts in the fruit slice, extending from the inner and outer edges thereof, and additional means arranged at the lower side of said first named means to cut through the fruit slice on a line intersecting said radial cuts.

7. In a machine for cutting annular slices of fruit into a plurality of portions of substantially uniform size, a magazine to receive the fruit slices, a sleeve and means for detachably mounting said sleeve in the lower end of the magazine, inner and outer cutting knives fixed within said sleeve and radially disposed with respect to a common center, said knives being arranged out of alignment with each other, the knives in one series having cutting edges inclined longitudinally of the sleeve in a reverse direction to the cutting edges of the other series of knives, whereby a plurality of radial cuts are produced in a fruit slice forced between the two series of knives, said cuts extending from the inner and outer edges of the fruit slice, and additional means arranged at one end of said two series of knives and adapted to cut through the fruit slices on a circular line intersecting the adjacent ends of said radial cuts.

8. In a machine for cutting annular slices of fruit into a plurality of portions of substantially uniform size, a sleeve and means for detachably mounting said sleeve in the lower end of the magazine, inner and outer cutting knives fixed within said sleeve and radially disposed with respect to a common center, said knives being arranged out of alignment with each other, the knives in one series having cutting edges inclined longitudinally of the sleeve in a reverse direction to the cutting edges of the other series of knives whereby a plurality of radial cuts are produced in a fruit slice forced between the two series of knives, said cuts extending from the inner and outer edges of the fruit slice, a rotatably supported circular cutting knife extending into said sleeve adjacent to said first named knives, means for rotating said circular knife, said knife cutting through the fruit slice on a circular line intersecting the adjacent ends of said radial cuts.

9. In a machine for cutting annular slices of fruit into a plurality of portions of substantially uniform size, a magazine to receive the fruit slices, stationary cutting means arranged in the lower end of said magazine and including two series of knives adapted to produce radial cuts in the fruit slice extending from the inner and outer edges thereof, one series of cuts being out of alignment with the other series, means for forcing the superimposed fruit slices in the said magazine under pressure between said two series of knives and a rotary cutter adapted to subsequently cut through each fruit slice on a circular line intersecting said radial cuts.

10. In a machine for cutting annular slices of fruit into a plurality of portions of substantially uniform size, a magazine to receive the fruit slices, stationary cutting means arranged in the lower end of the magazine to produce a plurality of radial cuts extending from the inner and outer edges of each fruit slice, a rotatably mounted cylinder, a tubular cutting knife detachably fixed upon the upper end of said cylinder and having a circular cutting edge adapted to cut through the fruit slice on a line intersecting said radial cuts, means for rotating said cylinder, and a gravity movable plunger adapted to force the superimposed fruit slices downwardly in the magazine under pressure upon said cutting knives.

11. A method of cutting annular slices of fruit into a plurality of portions of substantially uniform size, which consists in first radially cutting the fruit slices at equidistantly spaced points and then cutting through the fruit slice on a circular line intersecting the said radial cuts at a point substantially midway between the inner and outer edges of the fruit slice.

12. A method of cutting annular slices of fruit into a plurality of portions of substantially uniform size, which consists in first cutting the fruit slice radially from its inner and outer edges at a plurality of spaced points with one series of radial cuts located out of alignment with the other series of radial cuts and the adjacent ends of said two series of radial cuts overlapping each other, and then cutting through the fruit slice on a circular line substantially concentric with the edges thereof and intersecting the overlapping ends of said radial cuts.

13. A portable hopper, comprising a cylinder open at its opposite ends, said cylinder having opposed slots in its wall adjacent one end thereof, and spring pressed pivoted members movable through said slots and normally extending into the cylinder to receive and support a plurality of superimposed fruit slices therein.

14. A portable hopper, comprising a cylinder, open at its opposite ends, said cylinder having opposed slots in its walls adjacent one end thereof, an exterior annular frame fixed to the cylinder wall, members pivotally mounted in said frame and leaf springs fixed at one of their ends to the cylinder wall and co-acting with the respective members to urge the same inwardly through the respective slots to a normal position to receive and support a plurality of superimposed fruit slices within said cylinder.

15. In a fruit cutting machine, a magazine adapted to receive a plurality of superimposed fruit slices, a series of radially disposed knives arranged in the lower end of said magazine and adapted to cut through the successive fruit slices along spaced radial lines as the slices are forced downwardly through the magazine, and additional means arranged in the lower end of said magazine below said radial knives to cut through each individual fruit slice on a circular line intermediate of the ends of said radial cuts.

16. In a fruit cutting machine, a magazine adapted to receive a plurality of superimposed fruit slices, means for forcing the slices downwardly, under pressure, through the magazine, and means arranged in the lower end of said magazine for successively cutting the individual fruit slices into a multiplicity of portions of substantially uniform size.

17. In a fruit cutting machine, a magazine adapted to receive a plurality of superimposed fruit slices, a standard, a weighted gravity movable plunger mounted upon and guided by said standard, said plunger adapted to be positioned in axial alignment with the magazine to force the fruit slices downwardly therein, means arranged in the lower end of said magazine for successively cutting the individual fruit slices into a multiplicity of portions of substantially uniform size, and means for sustaining said weighted plunger in an elevated position and at one side of the magazine during the charging of the latter.

In testimony that I claim the foregoing as my invention I have signed my name hereto.

EUGENE ROBERT JAGENBURG.